(12) United States Patent
Tin

(10) Patent No.: US 7,853,073 B2
(45) Date of Patent: Dec. 14, 2010

(54) INVERSION OF COLOR DEVICE MODELS

(75) Inventor: Siu-Kei Tin, Milpitas, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/399,742

(22) Filed: Apr. 7, 2006

(65) Prior Publication Data

US 2007/0237389 A1 Oct. 11, 2007

(51) Int. Cl.
G06K 9/00 (2006.01)
(52) U.S. Cl. .................................... 382/162
(58) Field of Classification Search ............... 382/162
See application file for complete search history.

(56) References Cited

U.S. PATENT DOCUMENTS

| | | | |
|---|---|---|---|
| 5,692,071 A * | 11/1997 | Govaert | 382/167 |
| 6,636,628 B1 * | 10/2003 | Wang et al. | 382/167 |
| 7,207,645 B2 * | 4/2007 | Busch et al. | 347/19 |
| 7,365,879 B2 * | 4/2008 | Braun et al. | 358/1.9 |
| 2002/0105659 A1 * | 8/2002 | Rozzi | 358/1.9 |
| 2003/0147088 A1 * | 8/2003 | Kulkarni | 358/1.9 |

* cited by examiner

*Primary Examiner*—Wenpeng Chen
(74) *Attorney, Agent, or Firm*—Fitzpatrick, Cella, Harper & Scinto

(57) ABSTRACT

A method and apparatus for inverting a color device model. A systematic color device model inversion process restarts a local iterative root finding process with new seeds that are adaptive to the last found solution. Because of the relative simplicity of the logic used, it is more robust and makes less assumptions about the smoothness of the forward model. It is also computationally inexpensive, because a reasonably good seed is chosen from the seed matrix using a fast calculation of distance, instead of running each seed in the seed matrix through the iterative root finding process. In the worst case, including the initial run, N+1 runs of the local iterative root finding process are needed to invert an input point, with N being the number of additional, a posteriori seeds generated.

12 Claims, 6 Drawing Sheets

INVERSION OF COLOR DEVICE MODELS

BACKGROUND

1. Field of the Invention

The present invention relates generally to using color devices and more specifically to inverting color device models.

2. Description of the Related Art

Characterization of color devices such as printers and display devices having their own device dependent color spaces, such as a color space having color values defined by Red Green and Blue (RGB), involves building a forward model and an inverse model. One approach to building the forward model is to sample the RGB color space with a uniform sampling grid, then building the forward model by interpolation on the uniform sampling grid. The inverse model, on the other hand, is built by inverting the forward model using a mathematical algorithm.

Because the forward model can be written mathematically as $$x = P(d)$$

where x is a perceptual color space, such as CIELAB, and d is a device color space, such as RGB, both of dimension 3, this can be viewed as solving 3 nonlinear equations in 3 unknowns. Viewed this way, the Newton algorithm for solving nonlinear equations can be applied to obtain a solution. This is an iterative algorithm wherein the algorithm is started with an initial estimate of the solution termed a "seed." The iterative step of the algorithm takes the estimate and returns a new estimate. At the end of each iteration, a stopping criterion is applied to determine if iteration loop should terminate. If not, then the new estimate is fed into the iterative step again to produce another estimate. The iterations will eventually stop if either the error is small enough (the solution is close enough) or a maximum number of iterations is reached.

The algorithm outlined above is usually called the "local" Newton algorithm because it is only guaranteed to converge locally, i.e., if the initial estimate is already close to the true solution, the algorithm will get to it very quickly, but if the initial estimate is not close, then the intermediate iterations may not even produce progressively better estimates. Instead, they may wander for a while before getting close to the true solution, if ever.

An advantage of the local Newton algorithm is that it is fast. It is faster than a brute force search for an enclosing tetrahedron, for example, in the case where the forward model is constructed by tetrahedral interpolation. However, the local Newton algorithm is plagued by convergence issues, some well-known in general for the local Newton algorithm, some peculiar to the application to inverting the device model.

One issue is that the iterative step may not decrease the error when the current estimate is far away from the true solution. A slight modification of the local Newton algorithm can be made to record the best solution as the iterations proceed, but still the local Newton algorithm does not guarantee that eventually the iterates will get close to the solution. This issue exists for the local Newton algorithm in general.

Another issue may also cause the iterates to fail to get close to the solution. This is because of the fact that the forward model does not strictly satisfy the smoothness assumption of the Newton algorithm. The usual assumption is that the nonlinear equations that we are trying to solve have continuous first derivatives. However, for forward models based on tetrahedral interpolation, the model is only differentiable—linear in fact—within each tetrahedron, but the derivative is discontinuous on the facets of the tetrahedron. The discontinuity sets up a "barrier" which an iterate may not get past. This issue exists because the device model is piecewise linear.

Another issue may cause the local Newton algorithm not to converge. An assumption of the algorithm is that the independent variables are unbounded. This is not the case for device color spaces such as RGB space, which is bounded by 0 and 1 in each channel.

There are known solutions to the first issue discussed above. It is possible to "globalize" the Newton algorithm by taking a partial Newton step when the iterate is far away from the true solution, a step that would decrease the error, and taking the full step only when the iterate is close enough. The calculation of the partial step, however, is quite expensive computationally. Note that low computational cost is an advantage of the local Newton algorithm. Also, the global Newton algorithm does not address the second and third issues which are peculiar to application to a forward model that is piecewise linear and bounded in the independent variables.

Therefore, a need exists for a process to invert a forward model for a color device that has better convergence properties than a process based on a local Newton model yet is still computationally inexpensive. Various aspects of the present invention meet such a need.

SUMMARY OF THE INVENTION

The present invention provides a method and apparatus for inverting a color device model. A systematic color device model inversion process restarts a local iterative root finding process with new seeds that are adaptive to the last found solution. Because of the relative simplicity of the logic used, it is more robust and makes less assumptions about the smoothness of the forward model. It is also computationally inexpensive, because a reasonably good seed is chosen from the seed matrix using a fast calculation of distance, instead of running each seed in the seed matrix through the iterative root finding process. In the worst case, including the initial run, N+1 runs of the local iterative root finding process are needed to invert an input point, with N being the number of additional, a posteriori seeds generated.

In one aspect of the invention, a method of finding a color value by inverting a color device model is provided. The method includes selecting a seed based on an input color value and generating an estimated color space using an iterative root finding process and the seed. If the estimated color space is not acceptable, the method determines a set of seed values using the estimated color value and generates an output color value using the set of seed values and the iterative root finding process.

In another aspect of the invention, selecting a seed value includes providing a seed matrix having a plurality of seeds and selecting a seed from the seed matrix that is closest to the input color value.

In another aspect of the invention, the method further includes providing a number of seed values for the set of seed values, determining a magnitude of a perturbation using the number of seed values, determining a direction of the perturbations for each dimension of the color device space using the estimated color value and generating the set of seed values using the estimated color value, the number of seed values, the magnitude of the perturbation and the directions of the perturbation.

In another aspect of the invention, the iterative root finding process uses a local Newton process.

In another aspect of the invention, the color device model to be inverted is a forward model for a color output device, the input to the color model is a perceptual color space and the output is a device color space.

BRIEF DESCRIPTION OF THE DRAWINGS

The present invention will be more readily understood from a detailed description of the preferred embodiment taken in conjunction with the following figures.

Identically labeled elements appearing in different ones of the figures refer to the same elements but may not be referenced in the description for all figures.

DETAILED DESCRIPTION

Figure 1:
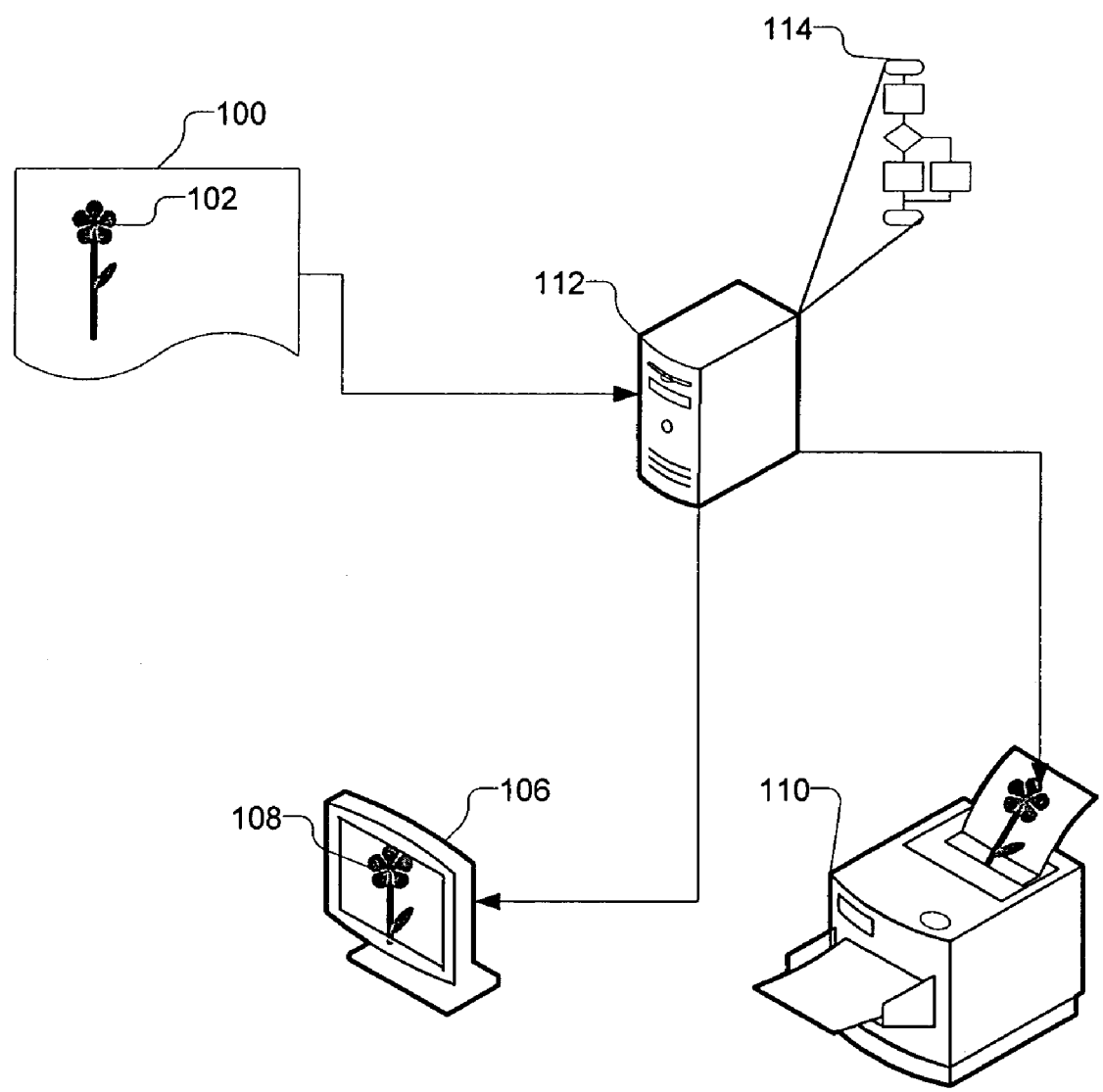
FIG. 1 is a block diagram of generating an output color display or printout in accordance with an exemplary embodiment of the present invention.

FIG. 1 is a block diagram of generating an output color display or printout using an inverted color device model in accordance with an exemplary embodiment of the present invention. A document 100 including a color image 102 may be displayed (108) on a color output device such as a color monitor 106 or printed (112) on a color output device such as a color printer 110 by a data processing apparatus 112 such as a computer. As each type of color device operates using different physical principles, each type of color output device has its own operating characteristics. In order to cope with a plurality of color output devices having different operating characteristics, color documents include color values specified in a standardized perceptual color space. A Color Management System (CMS) 114 is employed by the data processing apparatus 112 to generate the appropriate outputs for driving the color devices in their own device color spaces.

Figure 2:
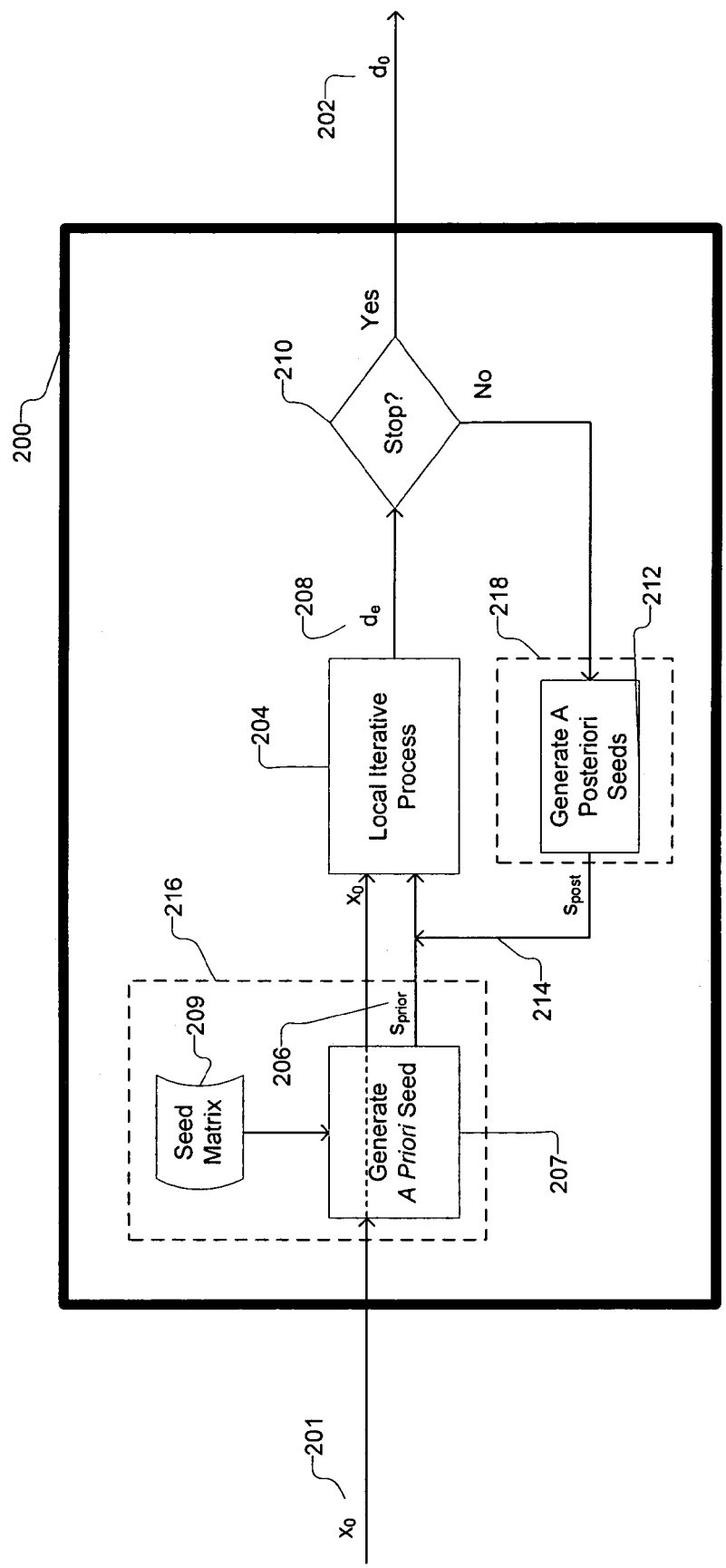
FIG. 2 is a process flow diagram of a color device model inversion process in accordance with an exemplary embodiment of the present invention.

The CMS 114 of FIG. 1 utilizes a color model inversion process to generate device color spaces using the forward models for the color devices. A process flow diagram of a color device model inversion process in accordance with an exemplary embodiment of the present invention is shown in FIG. 2. A color model inversion process 200 accepts as an input an input color value, $x_0$ 201, that is in a perceptual color space and outputs a device color value, $d_0$ 202 that is in a device color space.

The iterative root finding process 204 is an implementation of the Newton algorithm although other iterative root finding processes may be used. As discussed earlier, a global Newton algorithm attempts to solve the convergence problem by changing an iterative step. The computation of the step is expensive. The color model inversion process 200 solves the convergence problem differently. In general, if the iterates do not converge to the true solution, the iterative root finding process 204 is restarted with a different initial estimate, or seed.

To implement this approach, the color model inversion process 200 can be understood as having two distinct seed finding portions providing seeds to the iterative root finding process 204. A first seed finding portion 216 provides an a priori seed 206 to the iterative root finding process 204 and a second seed finding portion 218 supplies a posteriori seeds 214 if the a priori seed 206 fails to give a solution that is within the error tolerance.

When the color model inversion process 200 is initiated, an estimated device color value, $d_e$ 208, is generated using the input color value 201 and an a priori seed 206 generated (207) using the input color value 201 and a seed matrix 209. The estimated device color value 208 is then tested to determine if it is within an error threshold. This may be done by computing $P(d_e)$ and comparing the result to $x_0$ 201. If the estimated color value is within the error tolerance, the color model inversion process 200 stops (210) the iterative root finding process 204 and outputs the estimated device color value 208 as the output device color value 202.

If the estimated device color value 208 is not acceptable because it is outside the error threshold, the color model inversion process 200 generates (212) a set of a posteriori seeds 214 that are used as seeds for the iterative root finding process 204 to generate new estimated device color values which are again tested to determine whether or not to stop (210) the color model inversion process 200. However, if none of the seeds in the seed set 214 generate a better estimated device color value 208, a new set of seeds are not generated and the best estimated device color value 208 is output as the output device color value 202.

Having described the general structure of the color model inversion process 200, details of the seed generating portions 216 and 218 as well as the iterative loop process 204 will now be described. As discussed above, the forward model can be written mathematically as $$x = P(d)$$

where x is the device-independent, perceptually "linear" color space, such as CIELAB, and d is a 3-D device color space such as RGB. Inverting this model means that for an input color value, $x_0$, $d_0$ is found such that $d_0$ satisfies $x_0 = P(d_0)$. Intuitively, a good seed s would be one that is close to $d_0$ 202, which of course is unknown. However, if P(s) is close to $x_0$, then one can argue heuristically that s is a good seed. On the other hand, the best s is clearly dependent on $x_0$, and evaluation of P(s) can be expensive computationally. The approach taken is to pick s among a fixed set of seeds, called the seed matrix 209. P(s) is then computed for every point in the seed matrix 209 as described in FIG. 3.

Figure 3:
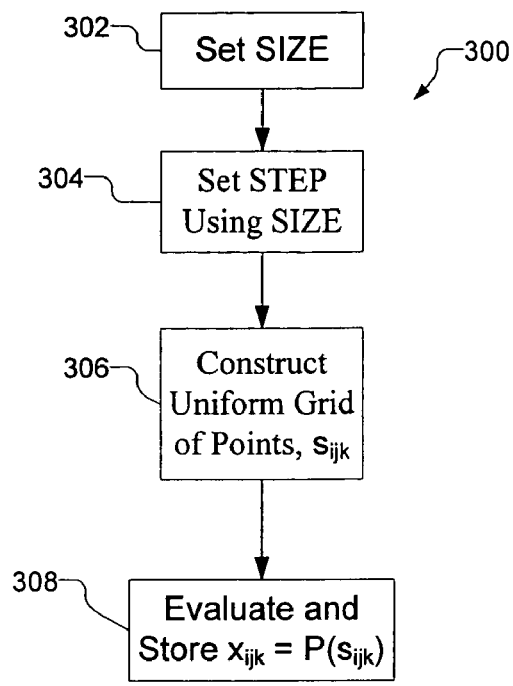
FIG. 3 is a process flow diagram of a seed matrix generation process in accordance with an exemplary embodiment of the present invention.

FIG. 3 is a process flow diagram of a seed matrix generation process 300 in accordance with an exemplary embodiment of the present invention. The seed matrix generation process 300 sets (302) a size for the seed matrix 209 (of FIG. 2), for example a SIZE of 8. Then the seed matrix generation process 300 calculates (304) a corresponding step as 1/SIZE. The seed matrix generation 300 process constructs (306) a uniform 3D grid of points in the device space, for a total count SIZE*SIZE*SIZE, which is offset from the boundary of the device space by STEP/2. In other words, the points in the seed matrix are centers of the cells, or more precisely:

$$s_{ijk} = (\text{STEP}/2 + (i-1)\text{STEP}, \text{STEP}/2 + (j-1)\text{STEP}, \text{STEP}/2 + (k-1)\text{STEP})$$

with i, j, k=1, ..., SIZE. Finally, the seed matrix generation process 300 evaluates (308) all $P(s_{ijk})$ and stores the values as $x_{ijk}$.

Referring again to FIG. 2, the stored values are the seed values of the seed matrix 209. The seed matrix 209 is used to find the best seed for use as the a priori seed 206, for example, by choosing the best seed among all $s_{ijk}$ such that $x_{ijk}$ is at the shortest "distance" from $x_0$. The distance does not need to be the usual Euclidean distance; it is more important that it is computationally efficient. One example of a good distance measure is the sum of squares of differences of the channels, which is the Euclidean distance without taking the square root.

If the a priori seed 206 fails to give a solution as the estimated device color value 208 that is within the error tolerance, then the color model inversion process 200 generates (212) the a posteriori seed set 214 to re-start the iterative root finding process 204. To do so, the color model inversion process determines the a posteriori seed set 214 based on the output of the first run of the iterative root finding process 204. For example, if $d_e=(r, g, b)$ and $P(d_e)$ is not close enough (according to the preset error tolerance) to $x_0$.

Conceptually, the color model inversion process 200 generates (212) the a posteriori seed set 214 by moving $d_e$ toward the center of the device color space in a step that depends on the number of a posteriori seeds in the a posteriori seed set 214. This is illustrated in FIG. 4 that is a graphic illustrating perturbation directions in accordance with an exemplary embodiment of the present invention.

Figure 4:
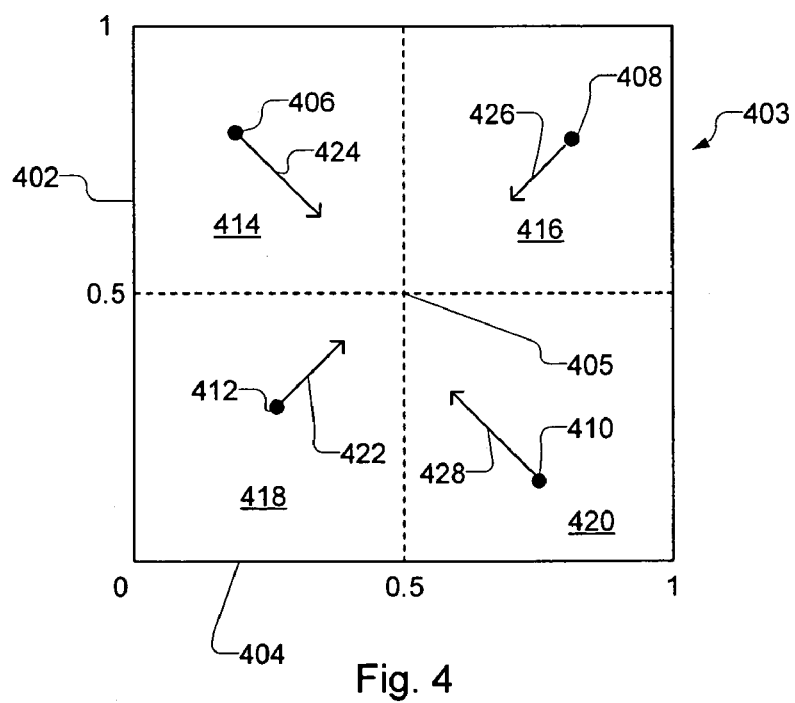
FIG. 4 is a graphic illustrating perturbation directions in accordance with an exemplary embodiment of the present invention.

In FIG. 4, the color space is depicted as a 2D space 400 with only two color channels, as indicated by A axis 402 and B axis 404 scaled from 0 to 1.0. This creates a color space 403 with a center 405 at 0.5, 0.5. A device color value, such as device color values 406, 408, 410 and 412, may be depicted as falling into the 2D space within a quadrant 414, 416, 418 or 420. In other words, as device color value 412's "A" and "B" values are less than 0.5, then device color value 412 is in quadrant 420. Therefore, to move device color value 412 toward the center 405, color value 412 is moved outward along both the A axis 402 and the B axis 404 vector 422. A similar logic holds for each of the device color values 406, 408 and 410 as they are moved along their respective vectors 424, 426 and 428. This general concept may be expanded for color spaces of any arbitrary dimensionality.

Figure 5:
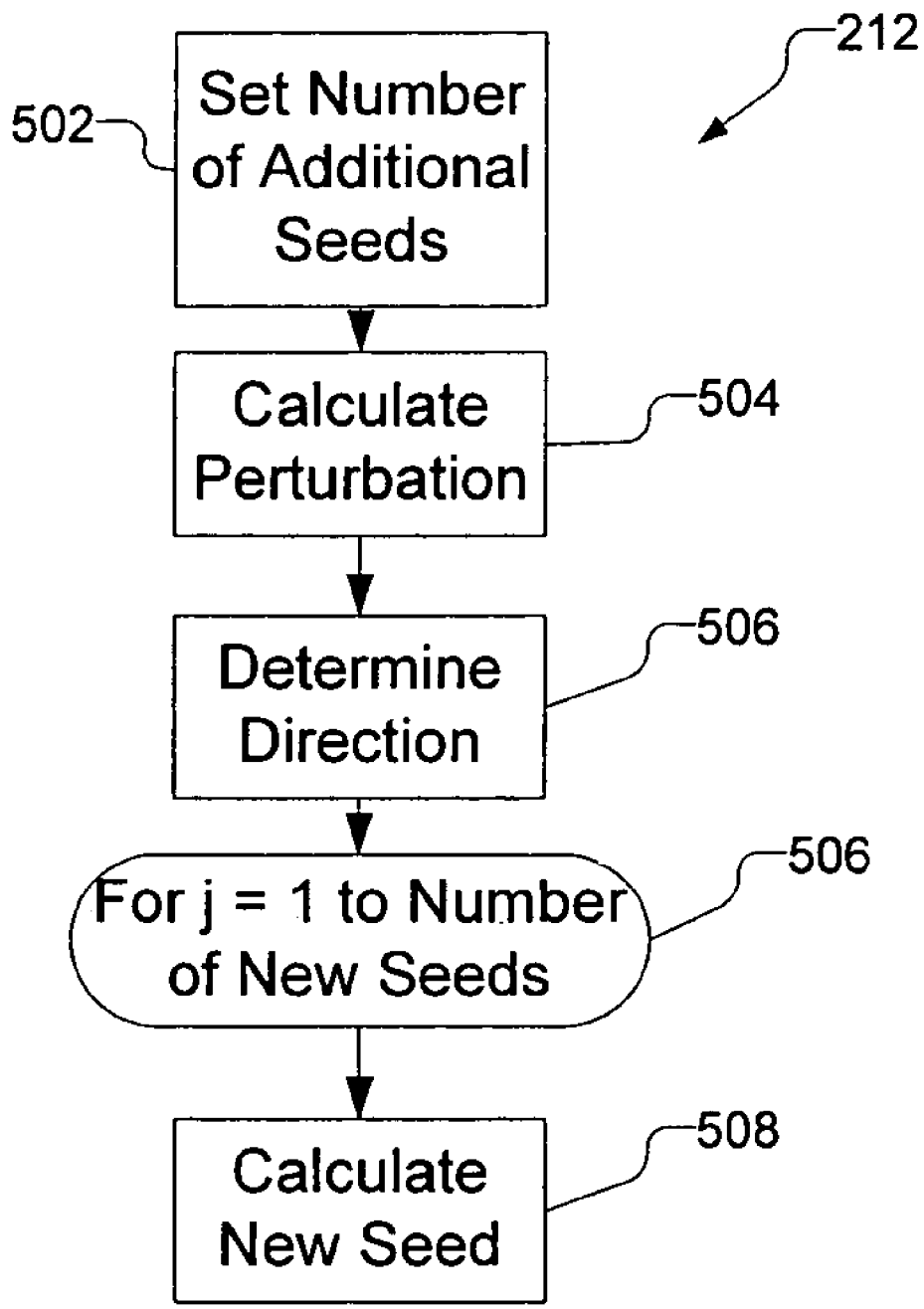
FIG. 5 is a process flow diagram of seed set generation process in accordance with an exemplary embodiment of the present invention.

Having described the concept of moving $d_e$ 208 of FIG. 2 toward the center of a color space, FIG. 5 illustrates a process flow diagram of an a posteriori seed set generation process 212 in accordance with an exemplary embodiment of the present invention. Initially, the seed set generation process 212 sets (502) "N" as the number of a posteriori seeds. The number of a posteriori seeds is arbitrary and N can be of any value such as 4. The seed set generation process 212 uses N to calculate (504) a magnitude of an increment, or perturbation, to move $d_e$ 208 of FIG. 2 along a color channel by

PERTURBATION=0.5/(N+1).

The direction to perturb $d_e$ 208 of FIG. 2 along color channel "r" is determined (506) by Dir(r)=−1 if r>0.5; +1 otherwise, Which is calculated similarly for Dir(g) and Dir(b). Then for, j equals one to N (506), the jth a posteriori seed is calculated (508) using (r+jDir(r)PERTURBATION,g+jDir(g)PERTURBATION,b+jDir(b)PERTURBATION)

Referring again to FIG. 2, a first a posteriori seed of the a posteriori seed set 214 is tried as a seed for the iterative root finding process 204. If the first a posteriori seed gives a new solution $d_e$ 208 within error tolerance, the color device model inversion process stops (210). Otherwise, a second a posteriori seed is tried and so on until the Nth a posteriori seed is tried.

Figure 6:
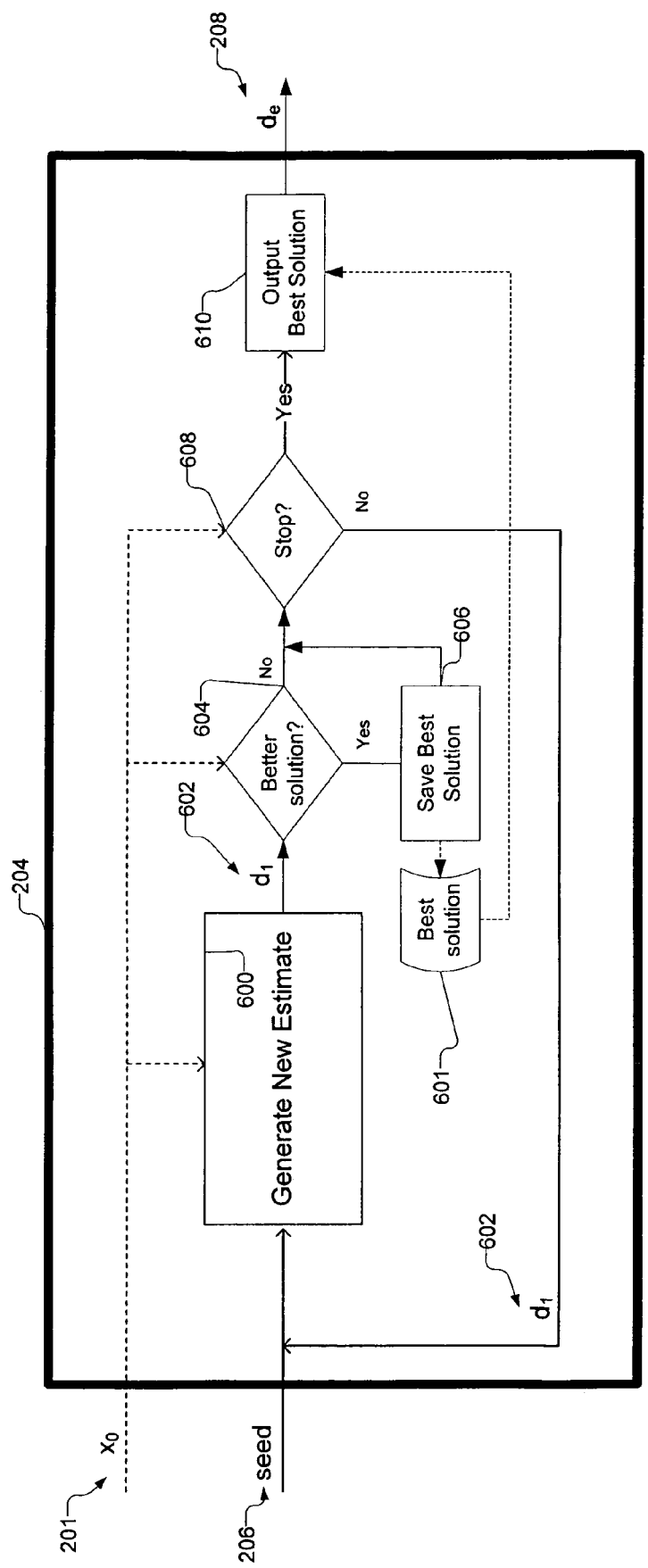
FIG. 6 is a process flow diagram of an iterative root finding process in accordance with an exemplary embodiment of the present invention.

As previously discussed, the iterative root finding process 204 is used to generate $d_e$ 208. FIG. 6 is a process flow diagram of the iterative root finding process 204 in accordance with an exemplary embodiment of the present invention. In one embodiment, the iterative root finding process 204 is a Newton process which is an implementation of the Newton algorithm. The Newton process is based on the color model and is modified to store the best intermediate solution 601 during the iterative processing. Many such implementations of Newton's algorithm, as well as other suitable iterative root finding algorithms, are well known in the art of numerical analysis. The iterative root finding process 204 receives as input an input color value 201 and a seed 206. The iterative root finding process 204 uses the seed 206 and the input color value 201 to generate (600) a current estimated color value $d_1$ 602. The current estimated color value 602 is compared to the best solution 601 so far to determine if the current estimated color space 602 is a better solution (604). Whichever is the better solution is saved (606) as the best solution 601. The iterative root finding process 204 continues by determining if the current estimated color value 602 is within an error tolerance of the actual solution. This may be done by computing $P(d_1)$ and comparing the result to $x_0$ 201. If the current estimated color value is within the error tolerance, the iterative root finding process 204 stops (608) and outputs (610) the best solution 601 as the estimated color value $d_e$ 202. If the current estimated color value 602 is not acceptable, it is used as the seed to generate (600) another current estimated color value 602. The iterative root finding process 204 iterates until the current estimated color value 602 is within a specified error tolerance or until a specified number of iterations is reached.

Figure 7:
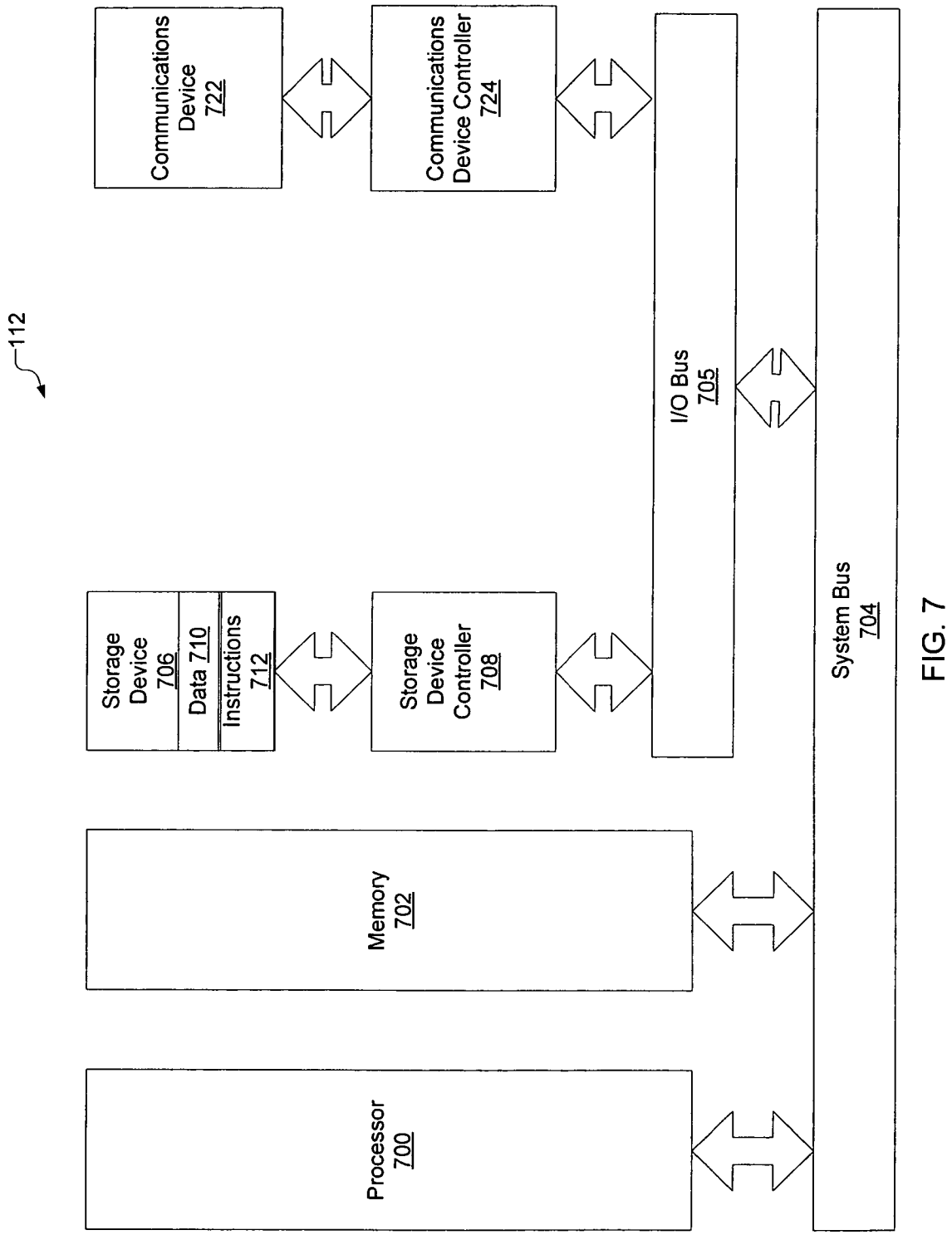
FIG. 7 is a block diagram of a data processing system in accordance with an exemplary embodiment of the present invention.

FIG. 7 is a block diagram of the data processing apparatus 112 of FIG. 1 in accordance with an exemplary embodiment of the present invention. The data processing apparatus 112 includes a processor 700 coupled to a memory 702 via system bus 704. The processor 700 is also coupled to external Input/Output (I/O) devices via the system bus 704 and an I/O bus 705. A storage device 706 having data processing apparatus or computer system readable media is coupled to the processor 700 via a storage device controller 708 and the I/O bus 705 and the system bus 704. The storage device 706 is used by the processor 700 to store and read data 710 and program instructions 712 used to implement a color model inversion process as described herein.

The processor 700 to a communications device 722 via a communications device controller 724 through the I/O bus 705 and the system bus 704. The data processing apparatus 112 may use the communications device to communicate with an external device, such as the color monitor 106 or the color printer 110 (both of FIG. 1).

In operation, the processor 700 loads the program instructions 712 from the storage device 706 into the memory 702. The processor 700 executes the loaded program instructions 712 to implement the color model inversion process as described herein.

While described in terms of processor coupled to a memory and a data storage device, it is to be understood that the data processing apparatus can take many forms as the data processing system is but one mechanism by which the color model is inverted using the processes described herein. The data processing apparatus may be in the form of a general purpose or special purpose computer. In addition, the data processing system may be implemented using hardwired circuitry or a hardcoded processing system. Furthermore, the data processing apparatus may be employed either internally or externally to a color device.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of finding a device color value by inverting a color device model, comprising:
    performing by a processor the following:
    selecting an a priori seed based on an input color value;
    generating an estimated color value using an iterative root finding process and the seed, wherein the iterative root finding process iterates repeatedly to generate the estimated color value until a stopping criterion is met; and
    performing the following if the estimated color value is not acceptable after the stopping criterion has been met:
    determining a plurality of a posteriori seed values using the estimated color value; and
    generating an output color value using the plural a posteriori seed values and the iterative root finding process, wherein the iterative root finding process iterates repeatedly to generate the output color value until the stopping criterion is met,
    wherein determining the plurality of a posteriori seed values comprises:
    providing a number of seed values for the plural a posteriori seed values;
    determining a magnitude of a perturbation using the number of seed values;
    determining a direction of the perturbations for each dimension of the device color space using the estimated color value; and
    generating the plural a posteriori seed values using the estimated color value that was not acceptable after the stopping criterion was met, the number of seed values, the magnitude of the perturbation, and the directions of the perturbation.

2. The method of finding a device color value of claim 1, wherein selecting the a priori seed value comprises:
    providing a seed matrix having a plurality of seeds; and
    selecting a seed from the seed matrix that is closest to the input color value.

3. The method of finding a device color value of claim 1, wherein the iterative root finding process is a local Newton process.

4. The method of finding a device color value of claim 1, wherein:
    the color device model to be inverted is a forward model for a color output device;
    the input to the inverted model is a perceptual color space; and
    the output of the inverted model is a device color space.

5. A data processing apparatus for finding a color value by inverting a color device model, comprising:
    a processor for executing stored instructions;
    a memory coupled to the processor for storing instructions executable by the processor,
    wherein the instructions comprise:
    selecting an a priori seed based on an input color value;
    generating unit an estimated color value using an iterative root finding process and the seed, wherein the iterative root finding process iterates repeatedly to generate the estimated color value until a stopping criterion is met; and
    performing the following if the estimated color value is not acceptable after the topping criterion has been met:
    determining a plurality of a posteriori seed values using the estimated color value; and
    generating an output color value using the plural a posteriori seed values and the iterative root finding process, wherein the iterative root finding process iterates repeatedly to generate the output color value until the stopping criterion is met,
    wherein the instructions determining the plurality of a posteriori seed values further comprise:
    providing a number of seed values for the plural a posteriori seed values;
    determining a magnitude of a perturbation using the number of seed values;
    determining a direction of the perturbations for each dimension of the device color space using the estimated color value; and
    generating the plural a posteriori seed values using the estimated color value that was not acceptable after the stopping criterion was met, the number of seed values, the magnitude of the perturbation, and the directions of the perturbation.

6. The data processing apparatus of claim 5, wherein the instructions selecting the a priori seed value further comprise:
    providing a seed matrix having a plurality of seeds; and
    selecting a seed from the seed matrix that is closest to the input color value.

7. The data processing apparatus of claim 5, wherein the iterative root finding process is a local Newton process.

8. The data processing apparatus of claim 5, wherein:
    the color device model to be inverted is a forward model for a color output device;
    the input to the inverted model is a perceptual color space; and
    the output of the inverted model is a device color space.

9. A computer-readable medium storing computer-executable instructions, the instructions comprising:
    selecting an a priori seed based on an input color value;
    generating unit an estimated color value using an iterative root finding process and the seed, wherein the iterative root finding process iterates repeatedly to generate the estimated color value until a stopping criterion is met; and
    performing the following if the estimated color value is not acceptable after the stopping criterion has been met:
    determining a plurality of a posteriori seed values using the estimated color value; and
    generating an output color value using the plural a posteriori seed values and the iterative root finding process, wherein the iterative root finding process iterates repeatedly to generate the output color value until the stopping criterion is met,
    wherein the instructions determining the plurality of a posteriori seed values further comprise:
    providing a number of seed values for the plural a posteriori seed values;
    determining a magnitude of a perturbation using the number of seed values;
    determining a direction of the perturbations for each dimension of the device color space using the estimated color value; and generating the plural a posteriori seed values using the estimated color value that was not acceptable after the stopping criterion was met, the number of seed values, the magnitude of the perturbation, and the directions of the perturbation.

10. The computer-readable medium claim 9, wherein the instructions selecting a seed value further comprise:
   providing the a priori seed matrix having a plurality of seeds; and
   selecting a seed from the seed matrix that is closest to the input color value.

11. The computer-readable medium of claim 9, wherein the iterative root finding process is a local Newton process.

12. The computer-readable medium of claim 9, wherein:
   the color device model to be inverted is a forward model for a color output device;
   the input to the inverted model is a perceptual color space; and
   the output of the inverted model is a device color space.

* * * * *